（12）United States Patent
Charlet et al.

(10) Patent No.: US 8,041,228 B2
(45) Date of Patent: Oct. 18, 2011

(54) FIBER OPTICAL TRANSMISSION SYSTEM, TRANSMITTER AND RECEIVER FOR DQPSK MODULATED SIGNALS AND METHOD FOR STABILIZING THE SAME

(75) Inventors: Gabriel Charlet, Villiers-le-Bacle (FR); Thibaut Fauconnier, Vouzon (FR)

(73) Assignee: Alcatel Lucent, Paris (FR)

( * ) Notice: Subject to any disclaimer, the term of this patent is extended or adjusted under 35 U.S.C. 154(b) by 567 days.

(21) Appl. No.: 11/583,020

(22) Filed: Oct. 19, 2006

(65) Prior Publication Data

US 2007/0122161 A1   May 31, 2007

(30) Foreign Application Priority Data

Nov. 25, 2005 (EP) .................................. 05292532

(51) Int. Cl.
*H04B 10/00* (2006.01)
(52) U.S. Cl. ........ 398/158; 398/188; 398/192; 398/195; 398/198; 398/208; 398/209; 398/213
(58) Field of Classification Search .................. 398/204, 398/182, 183, 140, 158, 188–198, 208–213; 359/245
See application file for complete search history.

(56) References Cited

U.S. PATENT DOCUMENTS 2,810,107 A * 10/1957 Sauber .......................... 324/119
(Continued)

FOREIGN PATENT DOCUMENTS
EP      1 168 038 A2    1/2002
(Continued)

OTHER PUBLICATIONS

Griffin.R.A., 10 Gb/s Optical Differential Quadrature Phase Shift Key (DQPSK) Transmission using GaAs/AlGaAs integration, 2002, Bookham Technology plc. Caswell, Towcester, UK,OFC 2002 Postdeadline Papers, FD6-1 to FD6-3.*

(Continued)

*Primary Examiner* — Li Liu
(74) *Attorney, Agent, or Firm* — Carmen Patti Law Group, LLC (57) ABSTRACT

A transmitter (3) for generating a DQPSK-modulated optical signal, including: a splitter (7) for dividing an optical carrier signal into a first and second branch (8a, 8b), a first and second Mach-Zehnder interferometer (9, 10) in the first and second branch (8a, 8b), respectively, a phase shifter (11) in one of the branches (8b) generating a nominal phase shift of .pi./2, and a combiner (7') for combining the optical output signals of the two branches (8a, 8b). The transmitter (3) has a feedback circuit (12) generating at least a first and second bias signal (15.1 to 15.3) for adjusting a bias of at least the first and second Mach-Zehnder interferometers (9, 10), the feedback circuit (12) includes a detector for generating at least a first and second feedback signal from a sample signal extracted from the optical signal after the combiner (7'), and for each bias signal: a local oscillator generating an auxiliary signal modulating the bias signal (15.1 to 15.3) at a pre-defined frequency (f1, f2, f3), a lock-in detector determining a phase difference between the feedback signal and the auxiliary signal, and a bias circuit for generating the bias signal (15.1 to 15.3) from an output signal of the lock-in detector, wherein the pre-defined frequencies of the auxiliary signals (f1, f2, f3) are different from one another (f1.noteq.f2.noteq.f3) and preferably no integer multiples of each other.

8 Claims, 8 Drawing Sheets

U.S. PATENT DOCUMENTS

| | | | |
|---|---|---|---|
| 3,479,601 A * | 11/1969 | Mattern | 455/319 |
| 4,162,398 A | 7/1979 | Kayanuma | |
| 5,805,321 A * | 9/1998 | Ooi et al. | 398/98 |
| 5,861,734 A * | 1/1999 | Fasullo et al. | 323/222 |
| 7,255,275 B2 * | 8/2007 | Gurevich et al. | 235/455 |
| 7,324,760 B2 * | 1/2008 | Gronbach et al. | 398/183 |
| 7,440,865 B1 * | 10/2008 | Hofmeister et al. | 702/120 |
| 2002/0181518 A1 * | 12/2002 | Mizutani | 372/27 |
| 2005/0074245 A1 | 4/2005 | Griffin | |
| 2005/0117191 A1 * | 6/2005 | Griffin | 359/245 |
| 2006/0133436 A1 * | 6/2006 | Nishiyama et al. | 372/38.04 |
| 2006/0133827 A1 * | 6/2006 | Becouarn et al. | 398/213 |
| 2006/0263097 A1 * | 11/2006 | Akiyama et al. | 398/188 |
| 2007/0019968 A1 * | 1/2007 | Hashimoto et al. | 398/198 |
| 2007/0047954 A1 * | 3/2007 | Mamyshev | 398/33 |

FOREIGN PATENT DOCUMENTS

| | | |
|---|---|---|
| EP | 1 168 041 A2 | 1/2002 |
| WO | WO 03/049333 A1 | 6/2003 |
| WO | WO 2004088397 * | 10/2004 |
| WO | WO 2005088876 A1 * | 9/2005 |

OTHER PUBLICATIONS

R. A. Griffin et al, Optical Socieety of America/Institute of Electrical and Electronics Engineers: "10 Gb/s optical differential quadrature phase shift key (DQPSK) trans mission using GaAs/AlGaAs integrationa" Optical Fiber Communication Conference and Exhibit. (OFC). Technical Digest Postconference Digest, Anaheim, CA, Mar. 17, 2002, Trends N Optics and Photonics Series, Washington DC, US, Vo. TOPS, vol. 70, Mar. 17, 2002, pp. 917-919, XP010618176.

M. Cavallari et al, Eletronic signal processing for differential phase modulation formats, Optical Fiber Communication Conference, 2004. OFC 2004 Los Angeles, CA, USA, Feb. 23-25, 2004, Piscataway, NJ, USA IEEE, vol. 1 Feb. 23, 2004, pp. 422-424, XP010744324.

* cited by examiner

FIBER OPTICAL TRANSMISSION SYSTEM, TRANSMITTER AND RECEIVER FOR DQPSK MODULATED SIGNALS AND METHOD FOR STABILIZING THE SAME

The invention is based on a priority application EP 05 292 532.8 which is hereby incorporated by reference.

TECHNICAL FIELD

The invention relates to a transmitter for generating a DQPSK-modulated optical signal comprising: a splitter for dividing an optical carrier signal into a first and second branch, a first and second Mach-Zehnder interferometer in the first and second branch, respectively, each being operated with an electrical modulation signal, a phase shifter in one of the branches generating a nominal phase shift of $\pi/2$, and a combiner for combining the optical output signals of the two branches.

The invention also relates to a receiver for demodulating a DQPSK-modulated optical signal, comprising: a splitter for dividing the optical signal into a first and second branch, each of the branches comprising: a balanced receiver following a differential interferometer, each of the differential interferometers comprising: a time delay and a phase shifter arranged in respective branches of the differential interferometer, the phase shifter generating a nominal phase shift with an absolute value of $\pi/4$.

The invention further relates to a fiber optical transmission system for DQPSK-modulated optical signals comprising a pre-coder for pre-coding a sequence of data bits by generating two electrical modulation signals, a transmitter for generating a DQPSK-modulated optical signal from the electrical modulation signals, an optical fiber line for transmitting the DQPSK-modulated optical signal, and a receiver for demodulating the DQPSK-modulated optical signal transmitted through the fiber line.

Finally, the invention relates to a method of stabilizing an optical phase shifter for a DQPSK-modulated optical signal, the optical phase shifter being preferably installed in a transmitter or receiver of the above-mentioned kind.

BACKGROUND OF THE INVENTION

Differential Quaternary Phase Shift Keying (DQPSK) is an advanced new modulation format that has received great attention as a promising candidate for high spectral efficiency optical networks operable in high-speed transmissions (43 Gbit/s and beyond). However, the generation and reception of DQPSK signals is quite complex, as several feedback signals have to be generated to stabilize the transmitter and receiver, respectively.

In the following, a quick overview of the DQPSK generation and reception will be given for a better understanding of the invention, starting from an explanation of the PSK and QPSK modulation schemes.

Figures 1, 2A:
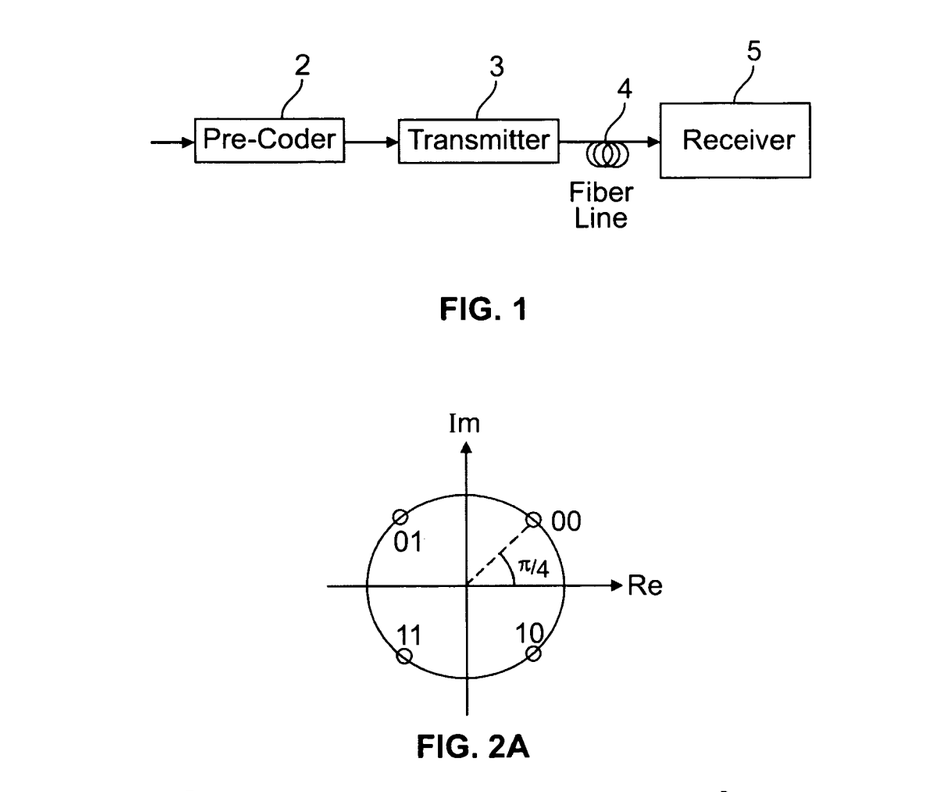
FIG. 1 shows a fiber optical transmission system for DQPSK-modulated optical signals.
FIG. 2a-c show a representation of DQPSK symbols in the complex plane for an ideal case (a), with a bias deviation (b), and a phase shift error (c), FIG. 3a, b show a transmitter for DQPSK-modulated signals according to the state of the art (a) and a transmitter according to the invention having a feedback circuit providing bias signals modulated at different frequencies (b)

Phase shift keying (PSK) is a digital modulation scheme for transmitting data by modulating the phase of a reference signal (carrier wave). Each of the phases is assigned a unique pattern of binary bits, in the following referred to as "symbol", represented by that particular phase. In QPSK, the symbols are arranged equally spaced around a circle in the complex plane, each symbol corresponding to a pattern of two bits ("dibits": "00", "10", "01" and "11") as shown in FIG. 2a. In Differential Phase Shift Keying (DPSK), information is not directly encoded in the phase of the symbols, but in their phase difference. Therefore, in the DQPSK modulation scheme the symbols of FIG. 2a are encoded in a pulse phase difference of $\pi/4$, $3/4\pi$, $-3/4\pi$, $-\pi/4$, respectively.

Although QPSK (and consequently DQPSK) can be viewed as a quaternary modulation, it is easier to see it as two independently modulated quadrature carriers. The even (odd) bits are then used to modulate the in-phase component of the carrier, while the odd (even) bits are used to modulate the quadrature-phase component of the carrier. Therefore, for generating a DQPSK signal, a binary bit stream has to be divided into two sequences corresponding to the in-phase and quadrature-phase components, respectively, such that the generation of a DQPSK modulated signal is more difficult compared to classical modulation schemes as e.g. On-Off Keying (OOK).

A fiber optical transmission system 1 for DQPSK-modulated optical signals shown in FIG. 1 has a pre-coder 2 for pre-coding a binary bit stream by generating the two sequences described above and forming two corresponding electrical modulation signals. These are provided to a transmitter 3 for generation of a DQPSK-modulated optical signal therefrom. The optical signal is then transmitted via a fiber line 4 to a receiver 5 which demodulates the DQPSK-modulated optical signal by reconstructing the in-phase and quadrature-phase components.

The following description will be focused on the transmitter 3 and receiver 5, as the pre-coding performed in the pre-coder 2 is of minor relevance for the invention and its mode of functioning is well-known to the person skilled in the art.

Figure 3A:
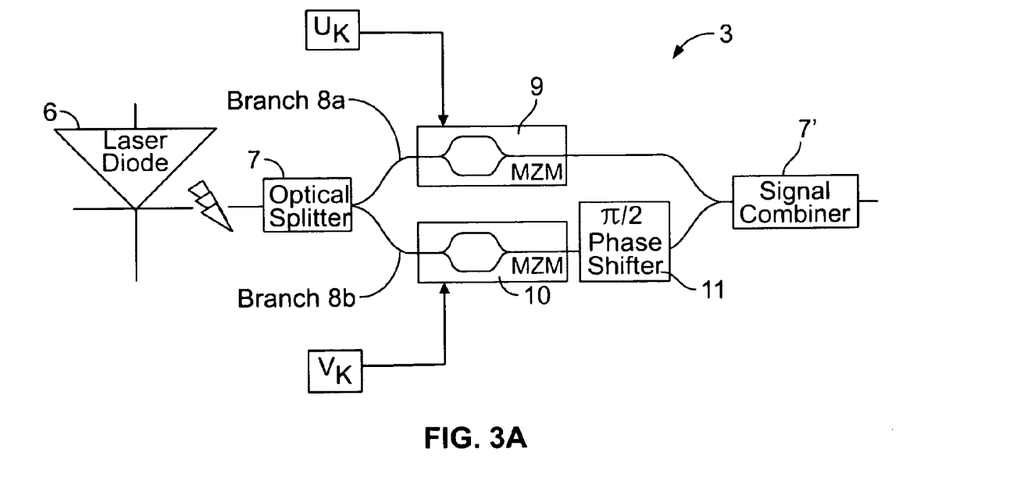

The DQPSK transmitter 3 of FIG. 1 is shown in greater detail in FIG. 3a and comprises a laser source 6 (laser diode) for generating an optical carrier signal, an optical splitter 7 for splitting the optical carrier signal into a first and second branch 8a, 8b with equal intensities, a first Mach-Zehnder Modulator (MZM) 9 in the first branch 8a, a second Mach-Zehnder Modulator 10 and an optical $\pi/2$ phase shifter 11 in the second branch 8b, and a signal combiner 7' to produce a single DQPSK output signal from the optical signals of the two branches 8a, 8b. The first and second MZMs 9, 10 are operated as phase modulators and are driven each with an electrical modulation signal $u_k$, $v_k$ corresponding to the in-phase and quadrature-phase sequences as described above. The electrical signals are provided with a data rate of 20 Gbit/s each, leading to an overall data rate of the optical signal of 40 Gbit/s.

In the transmitter 3, two imperfections have been pointed out: bias deviations of the Mach-Zehnder Modulators 9, 10 used as phase modulators and phase shift errors of the $\pi/2$ phase shifter 11, both of which will be described in greater detail below.

Figure 4:
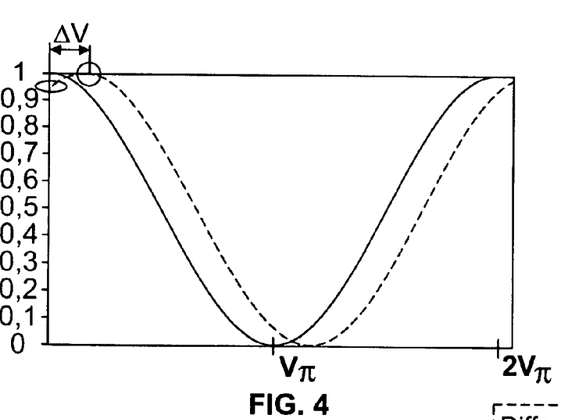
FIG. 4 shows the optical transmission of a Mach-Zehnder modulator in dependence of an electrical drive signal, FIG. 5a, b show a receiver of the state of the art (a) and a detail of a receiver according to the invention comprising a feedback circuit for generating a bias signal (b)

For modulating the optical carrier signal with the electrical modulation signals $u_k$, $v_k$, the Mach-Zehnder Modulators 9, 10 being simple two-wave interferometers are driven with an electrical drive voltage leading to a sinusoidal transfer function as shown in FIG. 4. When working properly, a bias voltage of the MZMs 9, 10 is set at the minimum of transmission of the interferometer such that the electrical drive for $+/-V_\pi$, respectively, correspond to two adjacent maximum transmission points, as is the case for the solid curve of FIG. 4. Then a high bit rate signal is applied which is centred around 0 V and has a 2 $V_\pi$ amplitude. However, if the bias voltage is not adjusted properly, a bias deviation $\Delta V$ may occur, leading to a shift of the transmission curve such that the maximum optical transmission is no longer attained for $+/-V_\pi V$ but for a higher voltage, as is the case for the dashed curve in FIG. 4.

Figure 2B:
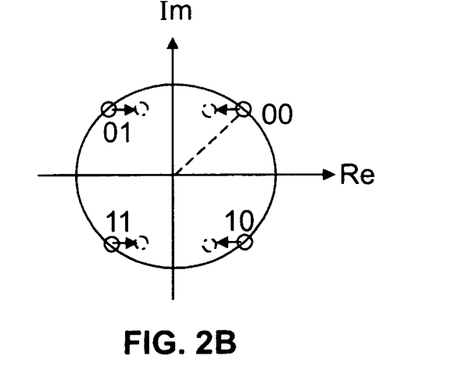

The bias deviation $\Delta V$, defined as a shift of the bias voltage from its proper value, leads to a modification of the symbol constellation by moving them from their ideal positions in the complex plane as shown by the arrows in FIG. 2b. A bias deviation in the MZM 9 of the first branch 8a shifts the symbols horizontally whereas a bias deviation in the MZM 10 of the second branch 8b containing the π/2 phase shifter 11 shifts symbols vertically (only the first case being shown in FIG. 2b). In both cases, symbols are closer to each other than in the idealistic case, such that back-to-back sensibility is lower.

Figure 10A:
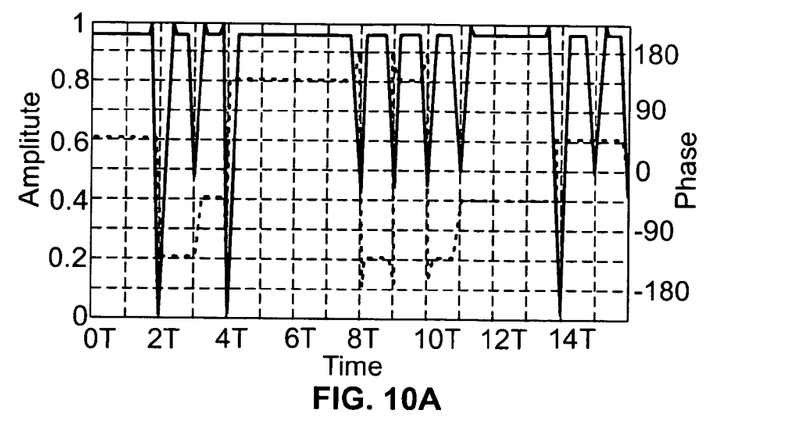
FIG. 10a-c show a time domain representation of: an optical output signal of a DQPSK transmitter with (a) a bias deviation of $\pi/10$ and (b) a phase shift error equal to $\pi/10$, as well as a time domain representation of an electrical signal at the output of a DQPSK receiver with a phase shift error of $\pi/10$.

The modification due to the bias deviation leads to an amplitude reduction in the DQPSK modulated signal as well as to phase errors, as modulated phases are not equal to 0 and π/2, see the time domain representation of FIG. 10a for an optical signal with a bias deviation equal to π/10, wherein the amplitude of the optical power and phase are represented by a solid and dashed line, respectively. The amplitude level of the modified signal is reduced compared to the ideal case, as the interferences of the signals from the two branches 8a, 8b in the combiner 7' of FIG. 3a are not totally constructive. Furthermore, some artefacts (spikes etc.) appear in the phase and amplitude curves as the maximum transmission is not centred on voltages $-V_\pi$ and $+V_\pi$, respectively.

Figure 11A:
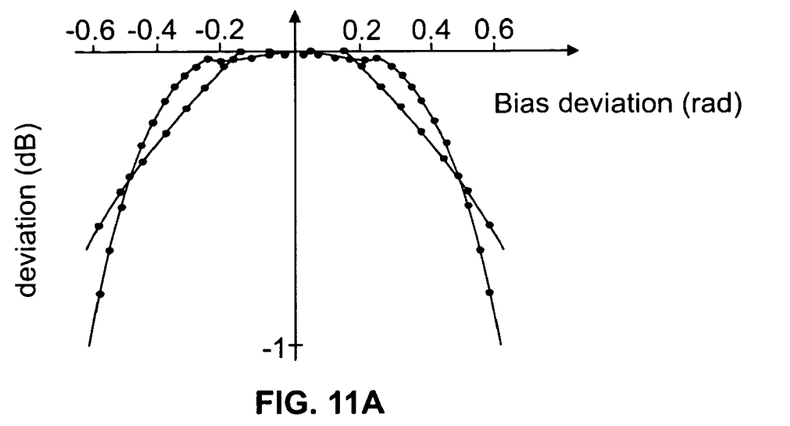
FIG. 11a-c show a deviation of a feedback signal and a Q-factor penalty (both in dB) in dependence of (a) a bias deviation and (b, c) a phase shift error, respectively.

The degradation of the performance of an optical transmission system caused by the bias deviation can be gathered from FIG. 11a, showing the Q-factor penalty (solid line) and output power deviation (dashed line) measured in dB in dependence of the bias deviation for an optical signal-to-noise ratio (OSNR) of 14.5 dB. It can be gathered from FIG. 11a that even though system performance is not strongly affected for low bias deviations, large penalties are caused for higher deviations, leading to a 1 dB penalty for a deviation of 0.6 rad. Therefore, it is mandatory to find a way of reducing the bias deviations in the MZMs 9, 10 for stabilizing the transmitter 3 of FIG. 3a.

Figure 2C:
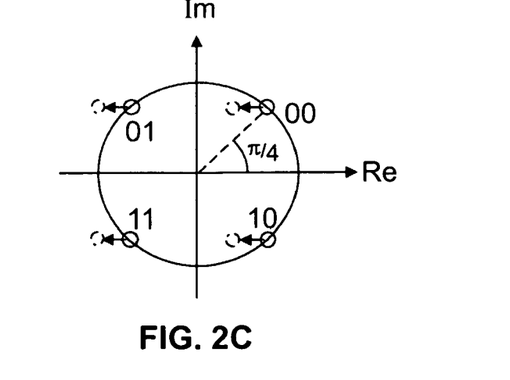
Figure 10B:
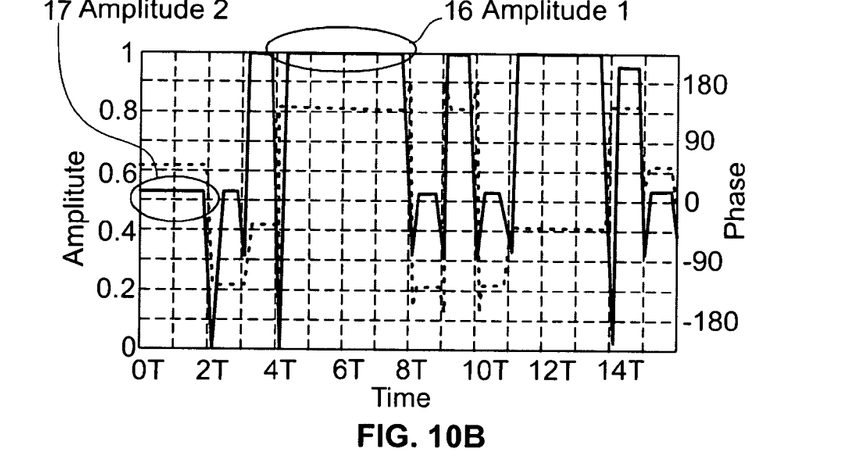
Figure 11B:
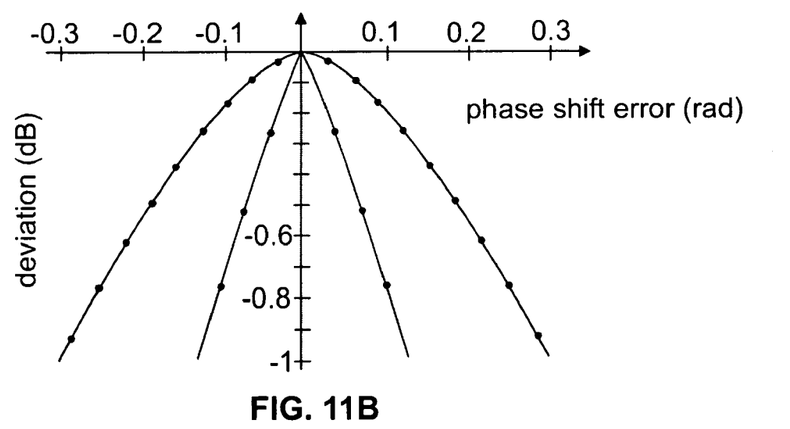

Furthermore, the DQPSK transmitter 3 of FIG. 3a has to be stabilized with respect to impairments caused by the π/2 phase shifter 11. If the phase shift of the phase shifter 11 is not equal to π/2, interferences in the optical combiner 7' or differential interferences at the demodulation part of a subsequent receiver are no more fully constructive or destructive. As can be gathered from FIG. 2c, representing the DQPSK symbols in the complex plane, a phase shift error leads to a dissymmetry in the DQPSK constellation resulting in different distances between the symbols, thus leading to different amplitude levels of the DQPSK optical signals generated in the transmitter 3, as can be gathered from FIG. 10b showing a time domain representation of an optical signal for a phase shift error of π/10. The main impairment of the π/2 phase shift error is the imperfection of interferences in the optical combiner 7' at the output of the transmitter 3 of FIG. 3a. As a result, in addition to a first (normalized) power amplitude level 16, there is a second amplitude level 17 in the DQPSK optical signal (both marked by circles in FIG. 10b) such that detection at the receiver 5 of FIG. 1 is penalized. This is especially serious when using differential interferences for the demodulation, as the imperfect interferences between consecutive pulses affect system performances, as shown in FIG. 11b representing the Q-factor (solid line) which is penalized by a phase shift error at the transmitter, such that a 1 dB penalty is obtained for a 0.3 rad (corresponding to π/10) phase shift error.

Figure 5A:
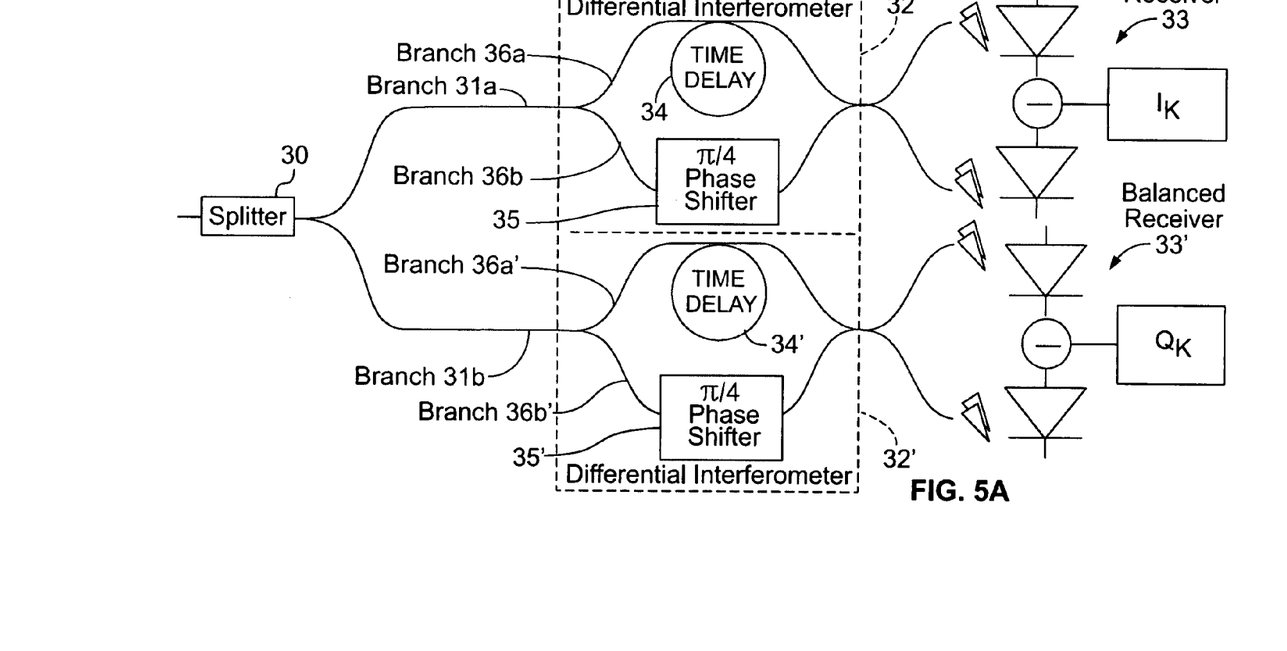

In addition to the impairments of the transmission system 1 of FIG. 1 which are due to the transmitter 3 and have been described above, there are further impairments due to the receiver 5 shown in greater detail in FIG. 5a.

The receiver 5 comprises a splitter 30 for splitting a received DQPSK optical signal in two equal parts, each of which is introduced to one of two branches 31a, 31b. In the following, only the components in the first branch 31a will be described in detail, like components of the second branch 31b being assigned primed reference numerals. The first branch 31a comprises a differential interferometer 32 for making two consecutive pulses interfere together and is followed by a balanced receiver 33. The differential interferometer 32 splits the optical signal into a first and second branch 36a, 36b, the first of which comprises a time delay 34, the second of which comprises phase shifter 35 with a nominal phase shift of +π/4. Both branches are recombined at the output of the interferometer 32 and split again before being introduced to photodiodes in respective branches of the differential receiver 33, transforming the two optical input signals of the photodiodes into one electrical output signal.

The second branch 31b differs from the first branch 31a only in that the phase shifter 35' generates a nominal phase shift of −π/4 instead of +π/4. The total phase difference between the two phase shifters 35, 35' of π/2 is the reason why the balanced receiver 33 of the first branch 31a decodes the in-phase components $I_k$ of the DQPSK optical signal, whereas the balanced receiver 33' of the second branch 33' decodes the quadrature-phase components $Q_k$.

The main impairment in the DQPSK receiver 5 described above consists in a phase shift which is not equal to π/4, resulting in a multi-level eye-diagram and lower sensibility at detection. This phase shift error may be due to the following origins: laser detuning, imperfections from the π/4 phase shifter, or a time delay T not equal to one bit time T.

All there causes can be summed up in a phase term Δφ:

$$\Delta\phi = \Delta\phi_{\pi/4 shift} + 2\pi\Delta v_{laser}T + 2\pi\Delta T v_0,$$

wherein:

$\Delta\phi_{\pi/4}$ is the phase shifter mismatching $\Delta v_{laser}$ is the laser detuning from its central wavelength $v_0$ $\Delta T$ is the bit time delay error In the following, the term "phase shift error" designates the phase term Δφ which is due to all the imperfections described above.

Figure 10C:
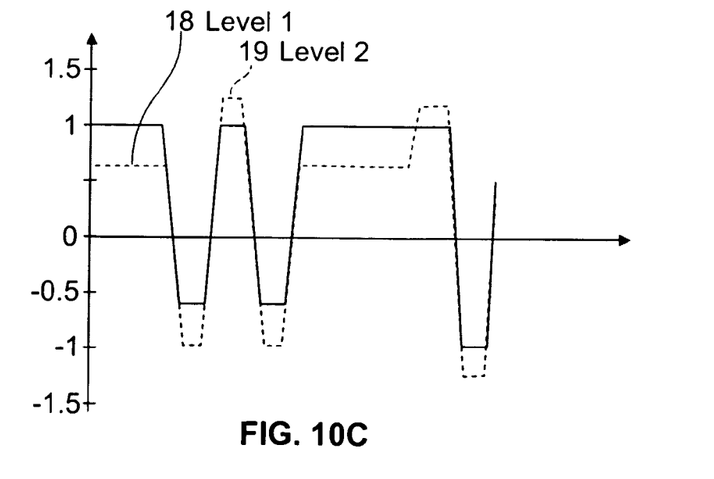

As is the case with the phase shift error of the transmitter, phase shift mismatching in the receiver also leads to imperfect interferences and consequently to a 4-level eye-diagram, i.e. 4 different amplitude levels. The time domain representation of the normalized amplitude of the voltage of the electrical signal at the output of the balanced receiver 33 is shown in FIG. 10c for the ideal case (solid line) and a phase shift error equal to π/10 (dashed line). It is remarkable that variations from the ideal signal are about 50% of the normalized intensity value, such that four distinct levels appear in this case instead of two levels when the receiver is optimized. Consequently, a logical "1" which should be encoded with a nominal amplitude level of 1.0 is encoded in two different amplitude levels, the first one 18 equal to 0.7, the second one 19 equal to 1.2.

Figure 11C:
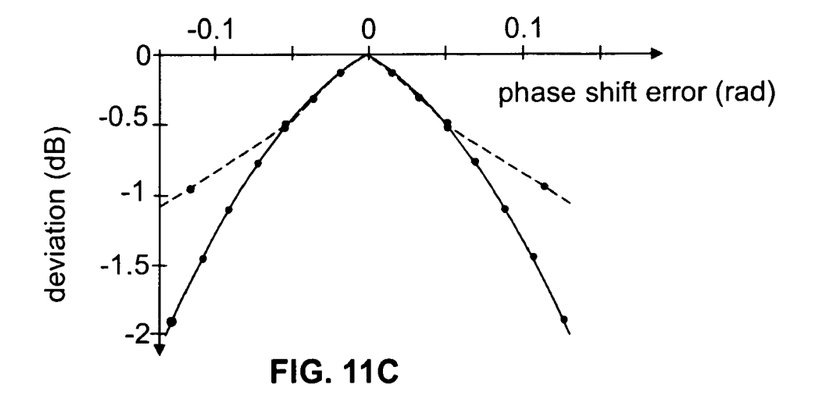

As expected, FIG. 11c shows that the tolerance to phase shift error measured as Q-factor penalty (in dB) at the receiver side is very low: 1 dB is obtained for ±π/40 (solid line). For comparison, a phase shift equal to π/40 corresponds to $\Delta v_{laser}$=500 MHz. Concerning a laser source, usual wavelength instability is around 0.01 nm, i.e. 1.2 GHz.

In summary, the transmitter as well as the receiver have to be stabilized in order to counteract the impairments illustrated above. Feedback signals have to be found for this purpose from which appropriate bias signals for the Mach-Zehnder modulators and phase shifters can be generated. The best prior art solution is to set modulator (transmitter) and demodulator (receiver) by using the Bit Error Rate (BER) as a feedback signal. The idea of this solution is to find optimal settings by minimizing the BER. However, the disadvantage of this solution for transmitter and receiver settings is the cost of BER monitoring, being a rather complex algorithm. Furthermore, the BER is monitored at the receiver side which may be located several hundreds of kilometers away from the transmitter.

SUMMARY OF THE INVENTION

It is a first object of the invention to provide a DQPSK transmitter of the above-mentioned kind stabilizing the Mach-Zehnder modulators, preferably also the π/2 phase shifter by bias signals generated in a surprisingly simple and cost-effective way.

It is a second object of the invention to provide a DQPSK receiver of the above-mentioned kind minimizing a phase shift error by bias signals generated in a surprisingly simple and cost-effective way.

It is a third object of the invention to provide a fiber optical transmission system for DQPSK-modulated optical signals having a transmitter and receiver being stabilized with respect to phase shift errors and bias deviations.

It is a fourth object of the invention to provide a method for stabilizing an optical phase shifter for a DQPSK-modulated optical signal using a bias signal that can be generated efficiently.

According to a first aspect of the invention, this object is achieved by a transmitter of the above-mentioned kind comprising a feedback circuit generating at least a first and second bias signal for adjusting a bias of at least the first and second Mach-Zehnder interferometers, the feedback circuit comprising: a detector for generating at least a first and second feedback signal from a sample signal extracted from the optical signal after the combiner, and for each bias signal: a local oscillator generating an auxiliary signal modulating the bias signal at a pre-defined frequency, a lock-in detector determining a phase difference between the feedback signal and the auxiliary signal, and a bias circuit for generating the bias signal from an output signal of the lock-in detector, wherein the pre-defined frequencies of the auxiliary signals are different from one another and preferably no integer multiples of each other.

The inventive transmitter generates bias signals in dependence of feedback signals based on the optical output signal of the transmitter, in contrast to the state of the art which generates the bias signals in dependence of the BER measured after a decision gate at the output of the receiver. The basic concept of the invention is to use the feedback signal(s) as an input signal for a lock-in detection which adjusts the bias signals provided to the Mach-Zehnder modulators (and preferably a further bias signal to the phase shifter) in such a way that a deviation of the feedback signal from a nominal value is minimized. Preferably, an individual feedback signal is generated for each of the first and second Mach-Zehnder modulators and the phase shifter, although it is also possible that one of these components may be provided with a bias signal which is not generated in the way described above. The principle of lock-in detection for stabilization of a single Mach-Zehnder modulator is known as such, see e.g. U.S. Pat. No. 6,278,539 B1, which is incorporated herein by reference in its entirety. It is understood that the modulation of the bias signal according to the present invention may either be performed in the feedback circuit, or in the Mach-Zehnder modulator, and that different possibilities for the modulation are possible, as described in detail in the above-referenced document.

In the present application, the stabilization of both Mach-Zehnder modulators is performed by generating two individual feedback signals from a common sample signal. In order to be able to generate individual feedback signals from the sample signal at the output of the combiner, the predefined frequencies of the auxiliary signals are chosen to be different from one another. Moreover, interferences between these frequencies may be suppressed when the frequencies are chosen to be no integer multiples of each other.

In a preferred embodiment of the transmitter, the detector comprises a mean power detection unit for generating a feedback signal indicative of a mean power of the sample signal. The mean power of the optical signal after the combiner is maximized when the bias deviation of the Mach-Zehnder modulators is minimized, see the dashed curve in FIG. 11a for the power deviation in dependence of the bias deviation. The mean power decreases with increasing bias deviation, in agreement with the fact that levels on the constellation diagram are closer when bias deviation increases. Consequently, through generating a bias signal which maximizes the feedback signal, the optimum setting of the Mach-Zehnder modulators can be attained.

In a further preferred embodiment, the detector comprises a peak power detection unit, preferably a quadratic detector, for generating a feedback signal indicative of a power of the sample signal exceeding a threshold value. The bandwidth of the quadratic detector is around 20 GHz (corresponding to the symbol rate of DQPSK as one symbol contains two bits). The feedback signal thus generated is used for generating a bias signal for the phase shifter. The mean power of the sample signal which is used for generating the feedback signals of the Mach-Zehnder modulators cannot be used in this case, as the mean power is constant whatever the phase shift is. However, as has been described above, the phase shift error causes the DQPSK-modulated signal to generate amplitude levels 18, 19 above and below a nominal level, as shown in FIG. 10c. Consequently, when setting the threshold value to the nominal amplitude level of the DQPSK-modulated signal (equaling 1.0 in FIG. 10c), generating a feedback signal based on the peak power which exceeds that nominal level and subsequently minimizing the feedback signal leads to an equalization of the amplitude levels, such that the amplitude levels 18, 19 above and below the nominal level can be re-combined. For the dependence of such a feedback signal on the phase shift error, see the dashed curve of FIG. 11b.

In a further highly preferred embodiment, the detector further comprises a bias tee, being a component which is used to pass a RF signal but allows to change the continuous wave (CW) level of the signal for generating an adjustable threshold value of the peak power detection unit. The bias tee generates an offset of the amplitude of the sample signal, such that the threshold value can be set at the nominal level of the DQPSK-modulated signal.

Preferably, the quadratic detection unit is a diode. A diode provides a quadratic characteristic above a certain voltage threshold (e.g. 0.7 V) and is therefore ideally suited as a peak power detection unit.

In a further preferred embodiment, at least one filter is arranged at the output of the detector. The signal at the output of the quadratic detector is nearly a CW signal (modulated at the frequency of the auxiliary signal in the KHz range), and the filter is a band-pass filter with a center frequency at the pre-defined frequency of the auxiliary signal.

According to a second aspect of the invention, this object is achieved by a receiver of the above-mentioned kind comprising a feedback circuit generating at least one bias signal for adjusting a bias of at least one of the phase shifters, the feedback circuit comprising: at least one detector for generating a feedback signal from a sample signal extracted from the output signal of a respective balanced receiver, the detector comprising a peak power detection unit, preferably a quadratic detector, for generating a feedback signal indicative of a power of the sample signal exceeding a threshold value, at least one local oscillator generating an auxiliary signal modulating the bias signal at a pre-defined frequency, at least one phase comparator determining a phase difference between the feedback signal and the auxiliary signal, and at least one bias circuit for generating the bias signal from an output signal of the phase comparator.

In the receiver according to the invention, the phase shift error $\Delta\phi$ described above can be minimized by generating a bias signal for the phase shifters in the same way as described in connection with the phase shifter of the transmitter, see the dashed curve of FIG. 11c for the dependence of the feedback signal deviation on the phase shift error. Although for reduction of the phase error of the receiver, instead of the lock-in detection, an eye monitor could be used, the latter has a complex and costly structure using double DFF, XOR etc., such that the solution provided by the invention is much simpler and the cost is drastically reduced. In further preferred embodiments, the detector further comprises a bias tea for generating an adjustable threshold value of the peak power detection unit (preferably a diode) and/or comprises at least one filter at the output of the detector.

According to a third aspect of the invention, the object is achieved by a fiber optical transmission system for DQPSK-modulated optical signals having a transmitter according to the first aspect of the invention and a receiver according to the second aspect of the invention, thus reducing Q-factor penalties due to the impairments described above.

According to a fourth aspect of the invention, the object is achieved by a method for stabilizing an optical phase shifter for a DQPSK-modulated optical signal, comprising the steps of: extracting a sample signal from the output of the phase shifter, generating a feedback signal by measuring the power of the sample signal exceeding a threshold value representing a nominal level of the DQPSK-modulated signal, and generating a bias signal for the phase shifter which minimizes the feedback signal preferably by lock-in detection, thus minimizing the phase shift error of the phase shifter.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DETAILED DESCRIPTION OF PREFERRED EMBODIMENTS

The following detailed description of the invention refers to the accompanying drawing. The same reference numerals may be used in different figures of the drawing to identify the same or similar elements.

Figure 3B:
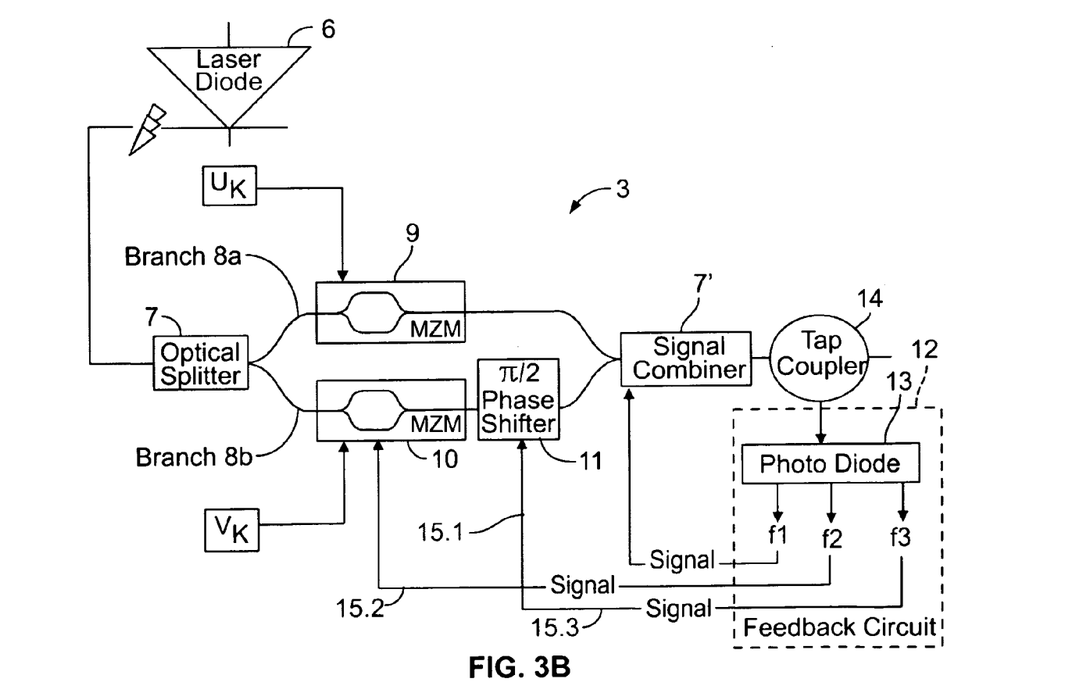

In the following, the stabilization of the DQPSK transmitter 3 represented in FIG. 3a will be explained. For the stabilization of the Mach-Zehnder modulators 9, 10 and the $\pi/2$ phase shifter 11 of the transmitter 3, it comprises a feedback circuit 12 shown in FIG. 3b. A sample signal is extracted from the output of the transmitter 3 after the combiner 7' by a tap coupler 14. The sample signal is fed to the feedback circuit 12 which comprises a photodiode 13 for o/e-conversion of the sample signal. The feedback circuit 12 uses the sample signal for generating three bias signals 15.1 to 15.3 each being modulated with a different pre-defined frequency f1 to f3, which are provided to the Mach-Zehnder modulators 9, 10 and the $\pi/2$ phase shifter 11, respectively. The bias signals 15.1 to 15.3 are chosen in such a way that the bias deviation of the MZMs 9, 10 and the phase shift error of the phase shifter 11 are minimized. FIG. 3b only represents the global architecture of the feedback circuit 12, the components necessary for generating the bias signals 15.1 to 15.3 not being represented graphically, as these will be described in connection with FIG. 6 and FIG. 7 below.

Figure 6:
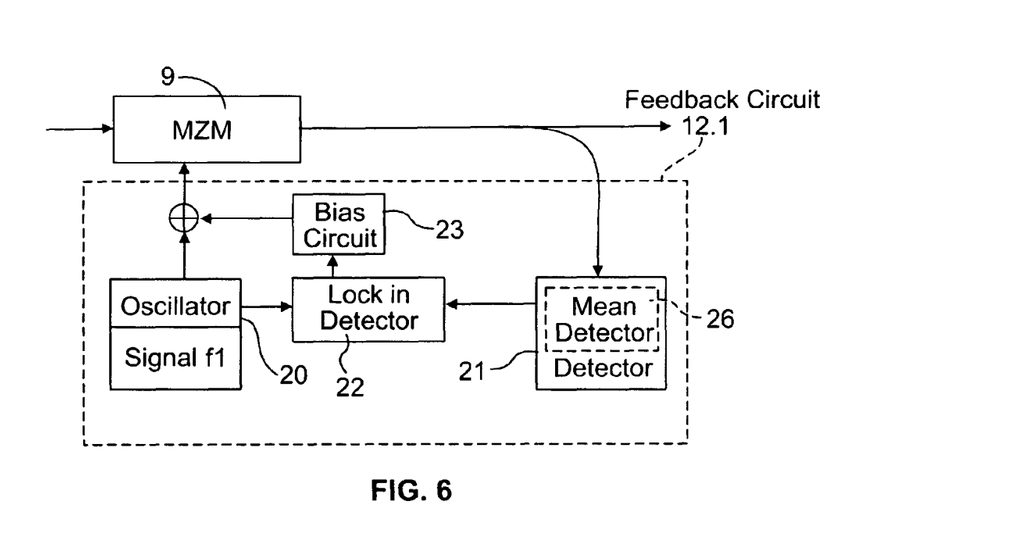
FIG. 6 shows a feedback circuit for generating a bias signal for a Mach-Zehnder modulator integrated in the transmitter of FIG. 3b.

FIG. 6 shows the components of the feedback circuit 12.1 which are necessary for generating a bias signal for the first Mach-Zehnder modulator 9. For this purpose, the feedback circuit 12.1 comprises a detector 21 with a mean power detection unit 26 for generating a feedback signal indicative of a mean power of the sample signal. A filter (not shown) is arranged in the detector 21 for selecting the components of the sample signal which are in a frequency range close to the pre-defined frequency f1. A local oscillator 20 generates an auxiliary signal modulating a bias signal generated in a bias circuit 23 with a pre-defined frequency f1. The feedback signal and the auxiliary signal are introduced to a lock-in detector 22 determining a phase difference between them. The output of the lock-in detector is filtered and provided to the bias circuit 23 for generating a DC bias signal which maximizes the feedback signal from the detector 21 in a way known to the person skilled in the art, being familiar with lock-in detection (as described in detail e.g. in U.S. Pat. No. 6,278,539). As has been described above, maximization of the mean power at the output of the transmitter 3 leads to a minimization of bias deviation of the Mach-Zehnder modulator 9. The same components as shown in FIG. 6 can also be used for generating a feedback signal for the second Mach-Zehnder modulator 10, the only difference being that the local oscillator 20 generates an auxiliary signal at a different frequency f2 for avoiding occurrence of interferences between the modulation frequencies of the bias signals.

Figure 7:
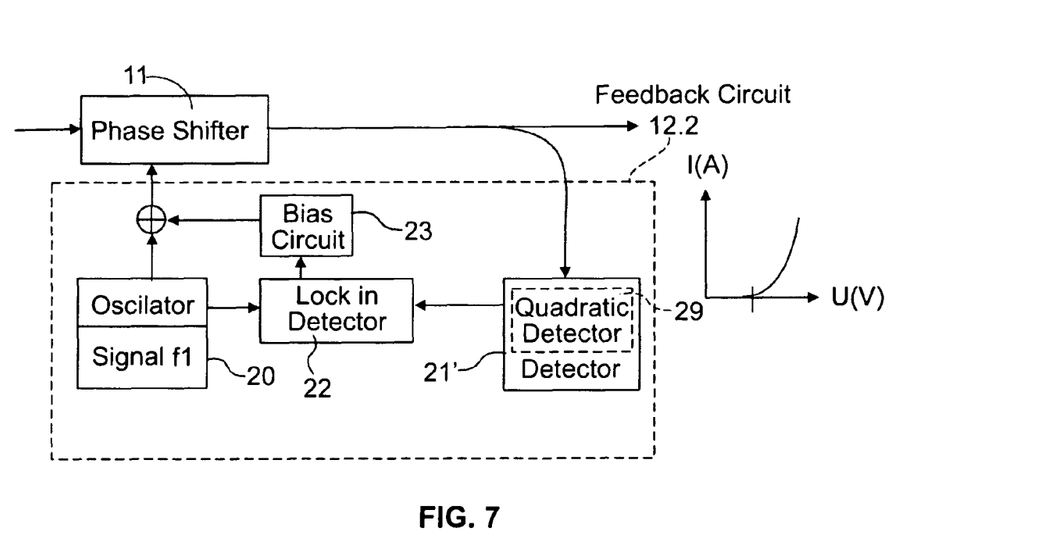
FIG. 7 shows a feedback circuit for generating a bias signal for the $\pi/2$ phase shifter of FIG. 3b using a quadratic detector.

FIG. 7 shows the components of a feedback circuit 12.2 for producing a bias signal for the phase shifter 11 which differs from the feedback circuit 12.1 of FIG. 6 only in that the detector 21' comprises a quadratic detector 29 as a peak power detection unit instead of the mean power detection unit 26. In this way, the power of the sample signal exceeding a threshold value representing a nominal level of the DQPSK-modulated signal can be measured and used as a feedback signal, as will be described in greater detail below. By minimizing the feedback signal thus generated, the phase shift error due to the phase shifter 11 can be minimized and hence equalization of the amplitude levels of the optical signal can be attained.

Two of the feedback circuits 12.1 as shown in FIG. 6 and the feedback circuit 12.2 of FIG. 7 are integrated into the feedback circuit 12 shown in FIG. 3b for providing bias signals for the two Mach-Zehnder modulators 9, 10 and the phase shifter 11, respectively. Of course, like components of the feedback circuits 12.1 and 12.2 can be arranged in common physical units of the feedback circuit 12 of FIG. 3b for providing a further reduction of costs.

Figure 5B:
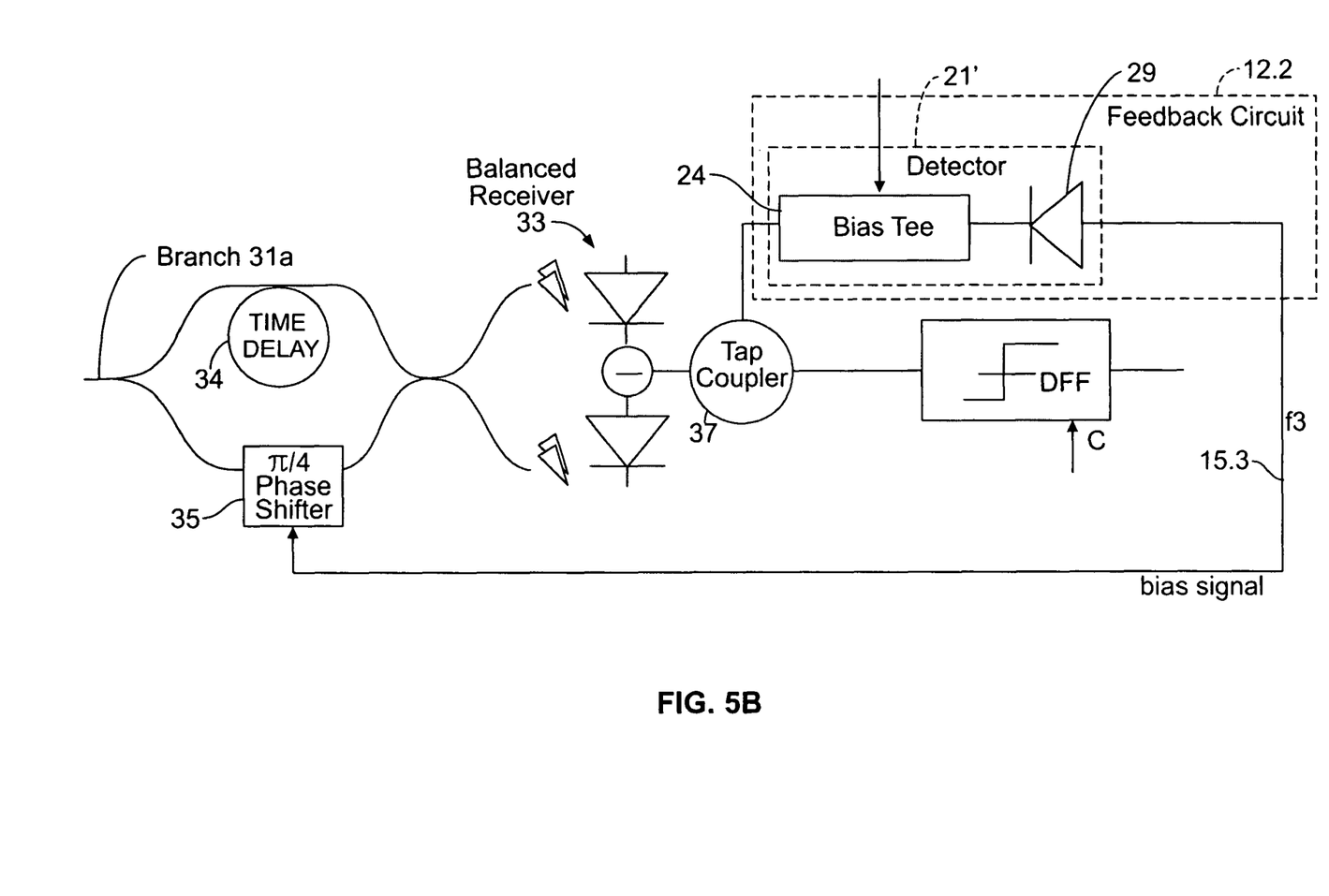

In the following, stabilization of the receiver 5 of FIG. 5a will be described in connection with FIG. 5b, showing the first branch 31a of the receiver 5 having a feedback circuit 12.2 as shown in FIG. 7. In the receiver 5, the electrical output signal of the first balanced receiver 33 is provided to a D-Flip-Flop (DFF) which is clocked with a clock signal C for further processing of the electrical signal. A tap coupler 37 is used to extract part of the electrical signal before the DFF, providing it as a sample signal to the feedback circuit 12.2 shown in FIG. 7 which comprises and an additional bias tee 24 in the detector 21' for generation of an offset of the sample signal such that the nominal amplitude level for the symbol "1" of the latter can be set to the threshold voltage of the diode serving as the quadratic detector 29. The bias tee 24 has three ports, a first one to which the RF signal from the tap coupler 37 is provided, a second one which has a CW level corresponding to the offset (represented by an arrow in FIG. 5b) and the output port which makes the sum of the two input ports.

Figure 8:
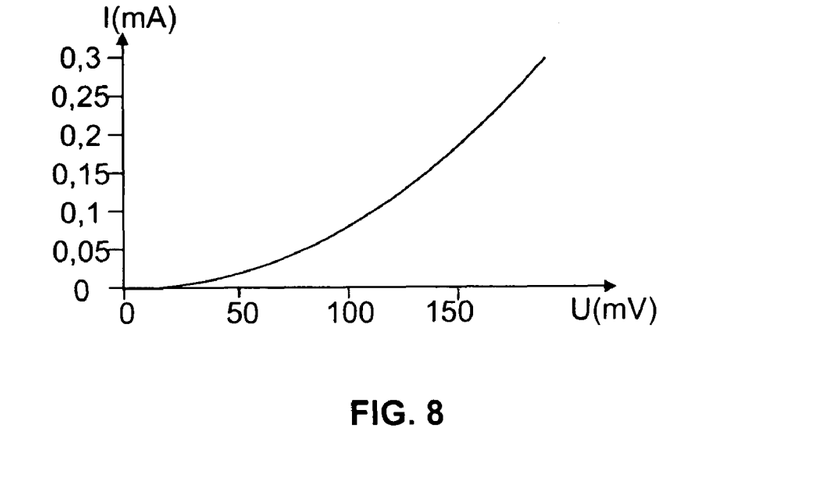
FIG. 8 shows a characteristic diagram of the current (in mA) in dependence of the voltage (in mV) of a quadratic detector.

A realistic quadratic detector characteristic is shown in FIG. 8, representing the current at the output of the diode (in mA) in dependence of the voltage (in mV). The bandwidth of the quadratic detector 29 should be chosen to be about 20 GHz in order to be able to detect the peak power.

Figure 9:
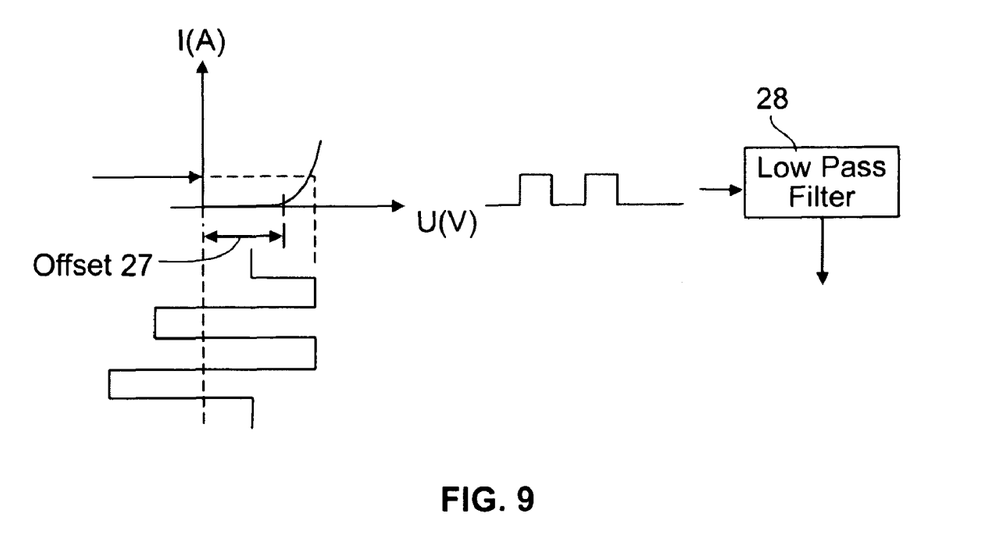
FIG. 9 shows the generation of a feedback signal from a sample signal using such a quadratic detector.

The generation of the feedback signal when using the quadratic detector 29 is now described in greater detail with respect to FIG. 9 which shows the quadratic detector characteristic of FIG. 8 in a more schematic way. The voltage of the input signal to the quadratic detector 29, i.e. the sample signal from the balanced receiver 33, is a 4-level signal in case that a phase shift error occurs. An offset 27 of the sample signal is adjusted such that the nominal amplitude level of the sample signal coincides with the threshold voltage of the diode (e.g. 0.7 V). The dependency of the diode current on voltages above the threshold has a quadratic characteristic and consequently the square wave output signal from the quadratic detector as shown in FIG. 9 represents the power of the electrical sample signal exceeding the threshold value. The output signal from the quadratic detector is almost a CW signal (modulated at the frequency f3 in the KHz range) and is provided to a low pass filter 28 for selecting the wavelengths close to the modulation frequency f3.

The feedback signal at the output of the filter 28 is then provided to the lock-in detection circuit comprising the lock-in detector 22, the bias circuit 23, and the local oscillator 20 of the feedback circuit 12.2 shown in FIG. 7 and FIG. 5b, generating an appropriate bias signal for the π/4 phase shifter 35 of the first branch 31a of the receiver 5. Of course, an identical feedback circuit 12.2 can be used for the stabilization of the second π/4 phase shifter 35' in the second branch 31b of the receiver 5. It is important to note that by generating the bias signal in the way described above, not only phase shift errors can be compensated for which are due to the phase shifters 35, 35', but also phase shift errors due to a frequency shift in the laser at the transmitter end, as well as phase shift errors due to the time delays 34, 34'.

The stabilized transmitter 3 and receiver 5 are advantageously used in a fiber optical transmission system as shown in FIG. 1, thus providing transmission of DQPSK-modulated signals without degradation due to phase shift errors or bias deviations. This is possible as the invention uses bias signals derived from judiciously chosen feedback signals the maximization and minimization of which leads to avoidance of bias deviations and phase shift errors, respectively. The maximization or minimization is preformed by a lock-in detection, such that the invention provides a simple and cost-effective way of generating bias signals for transmitting DQPSK-modulated signals with a low penalty.

The invention claimed is:

1. A transmitter for generating a DQPSK-modulated optical signal, comprising:
    a splitter for dividing an optical carrier signal into a first and second branch,
    a first and second Mach-Zehnder interferometer in the first and second branch, respectively, each being operated with an electrical modulation signal, wherein the first and second Mach-Zehnder interferometers are operated as phase modulators and wherein the electrical modulation signal corresponds to in-phase and quadrature-phase sequences of the system,
    a phase shifter in one of the branches generating a nominal phase shift of .pi./2,
    a combiner for combining the optical output signals of the two branches,
    a feedback circuit generating first and second bias signals for adjusting a bias of at least the first and second Mach-Zehnder interferometers, the feedback circuit comprising:
        a detector for generating first and second feedback signals from a sample signal extracted from the optical signal after the combiner indicative of a mean power of the sample signal, and for each of the first and second bias signals:
            a local oscillator, generating at least one auxiliary signal modulating each bias signal at a pre-defined frequency,
            a lock-in detector determining a phase difference between the at least one of a first and second feedback signal and the at least one auxiliary signal, and
            a bias circuit for generating the at least one of a first and second bias signal from an output signal of the lock-in detector, wherein the predefined frequencies of each of the auxiliary signals of the at least one auxiliary signal are different from one another, and the feedback circuit further comprises another detector which generates a third bias signal for adjusting a bias of the phase shifter, wherein said another detector comprises:
- a peak power detection unit, preferably a quadratic detector, for generating a third feedback signal from the sample signal,
- a local oscillator, generating at least one auxiliary signal,
- a lock-in detector determining a phase difference between the at least one of a first and second feedback signal and the at least one auxiliary signal, and
- a bias circuit for generating the third bias signal from an output signal of the lock-in detector wherein the third bias signal indicates
- a power of the sample signal exceeding a threshold value representing a nominal level of the amplitude of the sample signal.

2. The transmitter according to claim 1, wherein the detector further comprises a bias tee for generating an adjustable threshold value of the peak power detection unit.

3. The transmitter according to claim 2, wherein the quadratic detection unit is a diode having a quadratic characteristic above a voltage threshold.

4. The transmitter according to claim 1, comprising at least one filter arranged at the output of the detector.

5. A receiver for receiving a DQPSK-modulated optical signal, comprising:
- a splitter for dividing the optical signal into a first and second branch, each of the branches comprising:
  - a balanced receiver following a differential interferometer, each of the differential interferometers comprising:
    - a time delay and a phase shifter arranged in respective branches of the differential interferometer, the phase shifter generating a nominal phase shift with an absolute value of .pi./4, whereby a feedback circuit generating at least one bias signal for adjusting a bias of at least one of the phase shifters, the feedback circuit comprising:
      - at least one detector for generating a feedback signal indicative of a power of a sample signal extracted from the output signal of a respective balanced receiver, the detector comprising a peak power detection unit, preferably a quadratic detector, generating a feedback signal indicative of a power of the sample signal exceeding a threshold value, representing a nominal level of the amplitude of the sample signal, and a bias tee for generating an adjustable threshold value of the peak power detection unit to the nominal level of the DQPSK-modulated optical signal,
      - at least one local oscillator generating an auxiliary signal modulating the bias signal at a pre-defined frequency,
      - a phase comparator for determining the difference between the feedback signal and the auxiliary signal and
      - at least one bias circuit for generating the bias signal from an output signal of the phase comparator.

6. A receiver according to claim 5, comprising at least one filter arranged at the output of the detector.

7. A receiver according to claim 5, wherein the quadratic detector is a diode having a quadratic characteristic above a voltage threshold.

8. A fiber optical transmission system for DQPSK-modulated optical signals, comprising:
- a pre-coder for precoding a sequence of data bits by generating low electrical modulation signals,
- a transmitter for generating a DQPSK-modulated optical signal from the electrical modulation signals, comprising:
  - a splitter for dividing an optical carrier signal into a first and second branch,
  - a first and second Mach-Zehnder interferometer in the first and second branch respectively, each being operated with an electrical modulation signal,
  - a phase shifter in one of the branches generating a nominal phase shift of .pi./2,
  - a combiner for combining the optical output signals of the two branches,
  - a feedback circuit generating first and second bias signals for adjusting a bias of at least the first and second Mach-Zehnder interferometers, the feedback circuit comprising:
    - a detector for generating first and second feedback signals from a sample signal extracted from the optical signal after the combiner indicative of a mean power of the sample signal, and for each of the first and second bias signals:
      - a local oscillator, generating at least one auxiliary signal modulating each bias signal at a pre-defined frequency,
      - a lock-in detector determining a phase difference between the at least one of a first and second feedback signal and the at least one auxiliary signal, and
      - a bias circuit for generating the at least one of a first and second bias signal from an output signal of the lock-in detector, wherein the predefined frequencies of each of the auxiliary signals of the at least one auxiliary signal are different from one another, and
    - the feedback circuit further comprises another detector which generates a third bias signal for adjusting a bias of the phase shifter, wherein said another detector comprises:
      - a peak power detection unit, preferably a quadratic detector, for generating a third feedback signal from the sample signal,
      - a local oscillator, generating at least one auxiliary signal,
      - a lock-in detector determining a phase difference between the at least one of a first and second feedback signal and the at least one auxiliary signal, and
      - a bias circuit for generating the third bias signal from an output signal of the lock-in detector wherein the third bias signal indicates a power of the sample signal exceeding a threshold value representing a nominal level of the amplitude of the sample signal;
- an optical fiber cine for transmitting the DQPSK-modulated optical signal, and
- a receiver for demodulating the DQPSK-modulated optical signal transmitted through the fiber line comprising:
  - a splitter for dividing the optical signal into a first and second branch, each of the branches comprising:
    - a balanced receiver following a differential interferometer, each of the differential interferometers comprising:
      - a time delay and a phase shifter arranged in respective branches of the differential interferometer, the phase shifter generating a nominal phase shift with an absolute value of .pi./4, whereby a feedback circuit generating at least one bias signal for adjusting a bias of at least one of the phase shifters, the feedback circuit comprising:

at least one detector for generating a feedback signal indicative of a power of a sample signal extracted from the output signal of a respective balanced receiver, the detector comprising a peak power detection unit, preferably a quadratic detector, generating a feedback signal indicative of a power of the sample signal exceeding a threshold value, representing a nominal level of the amplitude of the sample signal, at least one local oscillator generating an auxiliary signal modulating the bias signal at a predefined frequency, a phase comparator for determining the difference between the feedback signal and the auxiliary signal and at least one bias circuit for generating the bias signal from an output signal of the phase comparator.

* * * * *